(12) United States Patent
Gilbert et al.

(10) Patent No.: US 6,795,530 B1
(45) Date of Patent: Sep. 21, 2004

(54) SYSTEM AND METHOD FOR CUSTOMIZED TELEPHONE GREETING ANNOUCEMENTS

(76) Inventors: Lanny Gilbert, 520 Carriage Dr., NE., Atlanta, GA (US) 30328; Raymond J. Smets, 2015 Westbourne Way, Alpharetta, GA (US) 30022

(*) Notice: Subject to any disclaimer, the term of this patent is extended or adjusted under 35 U.S.C. 154(b) by 611 days.

(21) Appl. No.: 09/606,062

(22) Filed: Jun. 29, 2000

(51) Int. Cl.[7] .............................................. H04M 1/64
(52) U.S. Cl. ................... 379/76; 379/88.19; 379/88.21; 379/142.01
(58) Field of Search ............................ 379/67.1, 88.19, 379/88.2, 88.21, 142.01, 142.06, 201.01, 201.02, 207.02, 207.15, 211.01–212.01, 221.08–221.09, 76, 77, 69, 70, 71, 72, 85

(56) References Cited

U.S. PATENT DOCUMENTS 5,278,894 A * 1/1994 Shaw ...................... 379/88.19
5,963,626 A * 10/1999 Nabkel .................. 379/142.01
6,266,399 B1 * 7/2001 Weller et al. ............ 379/88.19

* cited by examiner

*Primary Examiner*—Fan Tsang
*Assistant Examiner*—Ovidio Escalante
(74) *Attorney, Agent, or Firm*—Bambi F. Walters; Scott Zimmerman

(57) ABSTRACT

A system and method for providing customized announcements to callers based on the called party telephone number and the calling party telephone number. The system comprises a server system and a messaging system. The server system detects that a customized announcement is to be delivered and the messaging system delivers the announcement to the caller. The customized announcements may be provided in conjunction with voicemail systems or other services for processing calls when a called party is not available. In a preferred embodiment the customized announcements are provided via a service node in an advanced intelligent network.

21 Claims, 4 Drawing Sheets

SYSTEM AND METHOD FOR CUSTOMIZED TELEPHONE GREETING ANNOUCEMENTS

BACKGROUND

1. Field of the Invention

The present invention relates generally to telecommunications systems. More particularly, the present invention relates to voicemail and other personal communications telephone services.

2. Background of the Invention

Personal communications services have become a nearly ubiquitous means for facilitating communication between people. Such systems include, e.g., voicemail systems allowing callers to leave and/or retrieve messages at any time of the day or night, and "one number" type services wherein an incoming call is rerouted multiple times until the call is answered by a subscriber or an answering service. Such services generally allow information to flow between parties regardless of the immediate availability or location of each party. These services further simplify the communications process by allowing a service subscriber to give out a single telephone number to all of his or her business or social contacts.

Personal communications services have increased the possibility that a subscriber will receive information from a caller calling the subscriber's telephone number. However, such services have reduced the personal contact between the parties. In conventional personal communication services when a caller dials the subscriber's telephone number, an automated system offers a greeting to the caller and requests a response from the caller. The greeting may be a voice message from the subscriber, or a more general message provided by the system. The problem with such conventional personal communication services is that all callers receive the same greeting, regardless of the caller's relationship with the subscriber. Therefore, the subscriber's spouse, child, supervisor, close friends, and telemarketers all receive the identical greeting. Thus, subscribers tend to provide generic information in the greeting to avoid disclosing too much personal information to third parties. The problem is further illustrated by the following example.

Suppose a subscriber wishes to provide a general greeting to any unknown callers calling the subscriber's telephone number. Suppose further that the subscriber wishes to provide more specific information to important existing clients. Such specific information may include, e.g., the subscriber's home telephone number or address. Suppose further, that the subscriber wishes to greet his or her spouse or child with a more personal greeting. Using conventional services, the subscriber cannot distinguish between callers without maintaining multiple telephone numbers or mailboxes. Because all callers receive the same greeting, the subscriber is forced to choose between providing too many details or not enough details in the greeting.

Some conventional voicemail services can distinguish between internal and external callers, provided the system is operated through a private branch exchange ("PBX"). Such systems, however, can only provide two levels of personalization. That is, the caller either is, or is not calling from the same PBX. If the former is true, the caller receives one greeting, and if the latter is true, the caller receives another greeting. Such systems provide no distinction between different internal callers or different external callers.

A system and method is needed for facilitating more personalized communications between callers and personal communications service subscribers.

SUMMARY OF THE INVENTION

The present invention is a system and method for providing customized greeting announcements to callers according to instructions provided by a personal communications service subscriber. The invention uses a database for storing specific telephone numbers designated by the subscriber to receive a personal greeting. The invention further allows the subscriber to create different greetings for different groups of callers, and a default greeting for any unidentified callers or those callers calling from a telephone number not listed in the database.

When an incoming call is answered by the personal communications service, the system checks the database to see whether or not the subscriber has identified that calling party number ("CgPN") as a number that receives a personalized greeting. If the CgPN is in the database, the system plays the specific greeting selected by the subscriber for that specific caller (or group of callers if the CgPN is designated to receive a group greeting). If the CgPN is not in the database, the system plays a default greeting to the caller.

The system of the present invention comprises two main components: (1) a server system and (2) a messaging system. The server system comprises the database of designated numbers and a software module (programming logic) for using or manipulating the information contained in the database. The messaging system stores the customized announcements and has the capability to play selected announcements to a caller. The server system and the messaging system could be operated on a single integrated computer system or on multiple computers.

The present invention further provides an automated administration system allowing the subscriber to update his or her personal greetings and the associated list of callers, i.e., designated telephone numbers. To access the administration system, the subscriber calls an access telephone number. When connected, the subscriber may be prompted to provide authentication information such as the subscriber's telephone number and password. If the subscriber is authenticated, a menu-driven system of options is provided to the subscriber. For example, the administration system may prompt the subscriber to enter a telephone number to be added to, deleted from, or modified in the database.

A telephone service provider may deploy the present invention in the context of the Advanced Intelligent Network ("AIN"). In this case, a suitable AIN trigger on the subscriber's line causes the call to be temporarily suspended while the service control point ("SCP") determines the proper routing for the call. In a preferred embodiment, the SCP routes the call to a service node ("SN") based on the AIN trigger and the called party number, i.e., the subscriber's number. The SN then retrieves the subscriber's telephone number and the caller's telephone number and acts accordingly. Once the appropriate personal greeting has been played, the caller may be instructed to leave a message. Alternatively, the call may be disconnected or routed back to the SCP for further call processing. In other embodiments, the SN is not part of the call routing process.

It is an object of the present invention to provide a system and method facilitating more personalized communication between two or more parties.

It is a further object of the present invention to provide subscribers more flexibility to manage calls via a plurality of customized greeting announcements.

It is a further object of the present invention to provide a system and method allowing subscribers to offer individual personalized greetings to a plurality of callers.

These and other objects of the present invention are described in greater detail in the detailed description of the invention, the appended drawings and the attached claims.

DETAILED DESCRIPTION OF THE INVENTION

As discussed above, the present invention uses a database for storing subscription data for each subscriber of the service. Subscription data includes the calling party numbers designated by a subscriber and allows the subscriber to create a personalized greeting for each calling party number, or groups of calling party numbers, so designated. A computer having suitable processing speed and data storage medium provides the platform for the database of the present invention. The database may be created and managed using any suitable database software.

Table 1, below, identifies subscription data used in a preferred embodiment of the present invention. For example, the database preferably includes the subscriber's telephone number and a password. Note that the subscriber's telephone number, as used herein, means the telephone number that callers use to communicate with the subscriber. Table 2 is an example showing the type of data that may be stored in the database fields.

TABLE 1

Subscriber Telephone Number
PIN
Designated List
    $CgPN_1$, Announcement ID
    $CgPN_2$, Announcement ID
    $CgPN_3$, Announcement ID
    . . .
    $CgPN_n$, Announcement ID
    Undesignated Numbers, Default Announcement

TABLE 2

202-123-2222
123456
202-123-3333, Message 1
202-123-4444, Message 2
202-123-5555, Message 1
303-456-6666, Message 3
Undesignated Numbers, Message 4

Figure 1:
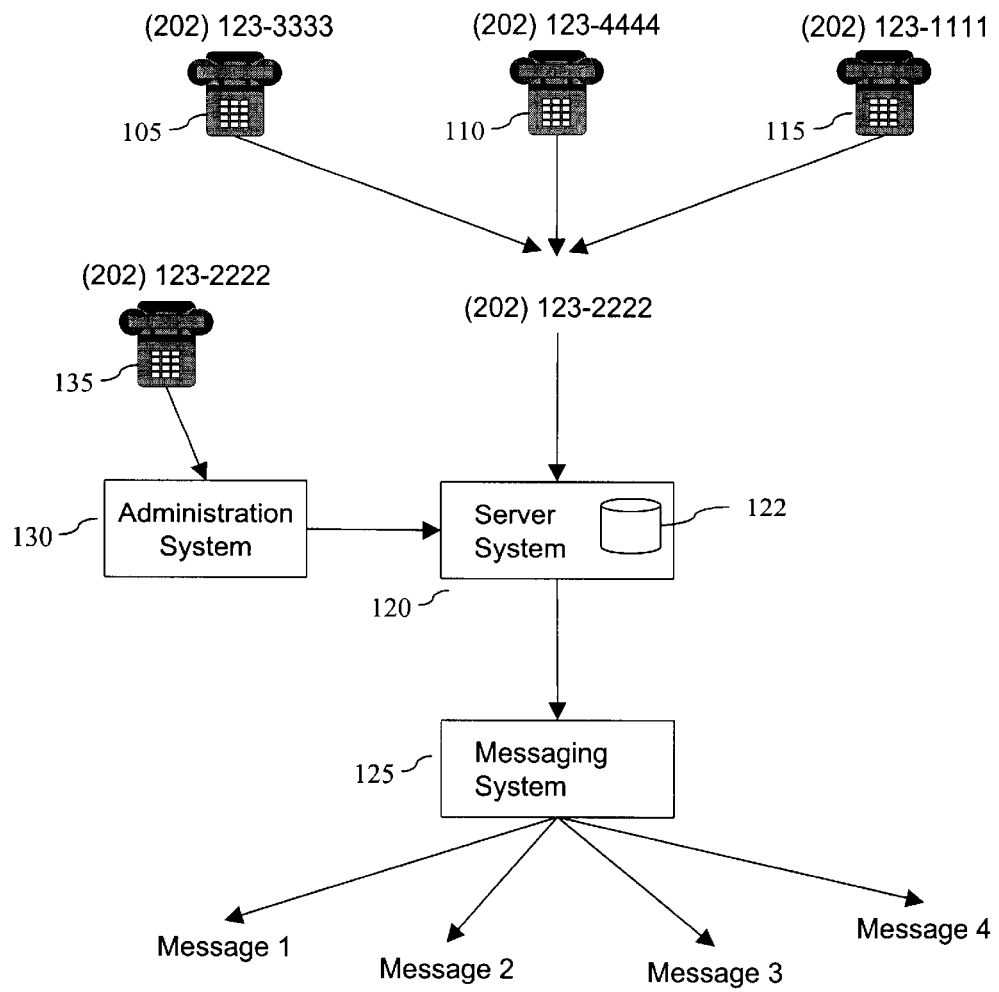
FIG. 1 is a block diagram showing the components of one embodiment of the present invention.

One of ordinary skill in the art of database programming can implement a database for storing fields such as shown in Tables 1 and 2. The purpose of the database is to allow the subscriber to designate which callers should receive a customized greeting, and to identify which customized greeting to play when an incoming call is received. FIG. 1 illustrates how the information in Table 2 is used in an embodiment of the present invention. Telephones 105, 110 and 115 have telephone numbers (202) 123-3333, (202) 123-4444 and (202) 123-1111, respectively, as shown in FIG. 1. All calls, including a call from one a caller using of these telephones, to the subscriber's telephone number (202) 123-2222 are handled by server system 120, where database 122 resides. Database 122 contains, among other things, the items shown in Table 2. Server system 120 checks database 122 to determine which message messaging system 125 should play to the caller. For example, a call from telephone 105 results in message 1 being played by messaging system 125 because it is from a designated calling number, while a call from telephone 115 results in the default message (message 4) being played because the telephone number (202) 123-111 has not been designated by the subscriber and stored in database 122.

Database 122 must be populated with subscription data for each subscriber of the customized greeting service. The service provider initially populates some or all of the data when a new subscriber is added to the service. Once the data is in place, subscribers may review or modify the information as required to customize the service using administration system 130, as shown in FIG. 1. Administration system 130 is also used to review or modify the customized greetings associated with each telephone number designated by the subscriber which are stored on messaging system 120. In a preferred embodiment, the subscriber could use subscriber telephone 135 which, in for example, has telephone number (202) 123-2222 to access administration system 130 to review or modify the database information. As explained below, when inbound calls are received by administration system 130, the system checks database 122 to see if the CgPN belongs to a subscriber. If the CgPN is a subscriber's telephone number, administration system 130 allows the subscriber access to the subscriber's subscription data. If the CgPN is not a subscriber's telephone number, administration system 130 may request additional information from the subscriber before granting access to the data, as described below.

Figure 2:
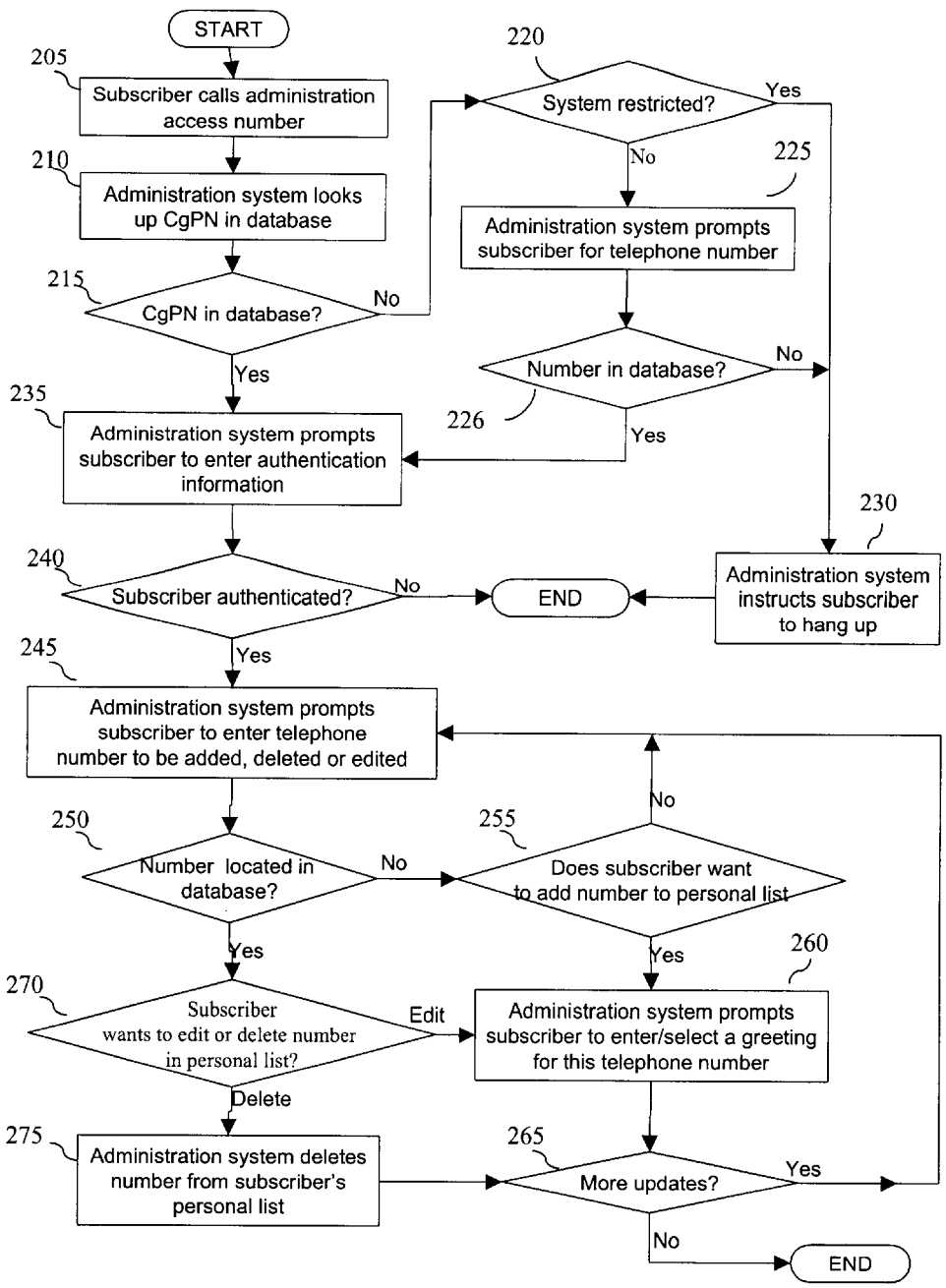
FIG. 2 is a flow diagram showing the steps executed in an example illustrating the administration system in one embodiment of the present invention.

The flow diagram in FIG. 2 is an example of steps that can be executed to carry out a preferred embodiment of the present invention. In this example, the administration system can be accessed by calling a telephone access number for the administration system (step 205). A subscriber using a touch-tone telephone can place the call. The administration system in this embodiment further uses the CgPN to determine whether or not the caller is a subscriber of the service (step 210). In step 215 the system determines if the CgPN is in the subscriber telephone number field of the database. If the CgPN does not correspond to a subscriber's telephone number in the database, the subscriber is prompted to enter his or her telephone number, unless the system is restricted (steps 220 and 225). If the administration system is restricted, then the administration system only accepts calls from subscribers using a designated telephone line to access the system. In that case, when the CgPN is not found in the database, the subscriber is instructed to hang up and call back from the proper telephone line (step 230). As noted above, if the administration system is not restricted, the system prompts the subscriber to enter a telephone number (step 225). In step 226, the system determines whether the telephone number entered is a valid subscriber number. If the telephone entered is not valid, i.e., the number is not found in the database, the system moves on to step 230, where the caller is instructed to hang up. Otherwise, if the telephone number is found in the database, the system moves on to step 235.

In step 235, the administration system prompts the subscriber for authentication information (e.g., a password or personal identification number ("PIN")). In step 240, the administration system compares the authentication information provided by the subscriber with the information in the database. If the authentication information matches the information in the database, the system leads the subscriber through a menu-driven system to implement the desired database updates in steps 245–265, as described below.

For example, the system prompts the subscriber to enter the telephone directory number to be added, deleted or modified on the system (step 245). In step 250, the system looks for the entered telephone number in the subscriber's personal list of telephone numbers. If the number is not located, the system asks the subscriber in step 255 whether the number is to be added to the subscriber's personal list. This step helps identify problems such as the subscriber entering a wrong number. If the subscriber does not wish to add this number, the system returns to step 245 and prompts the subscriber for a new telephone number. If the subscriber chooses to add the number, the system prompts the subscriber to enter or select a personal greeting to use for calls coming from this number (step 260). In step 265, the system determines whether or not the subscriber has additional updates to the database. If the subscriber has additional updates, the system returns to step 245 and the subscriber is prompted to enter to telephone number to be added, deleted or modified.

If in step 250 the system was able to identify the telephone number entered by the subscriber as an existing number in the database the system moves on to step 270. In step 270, the system determines whether the subscriber wishes to edit the greeting or delete the number from the subscriber's designated list. If the subscriber wishes to delete the number, the system moves on to step 275 in which the number is removed from the subscriber's personal list. After deleting the number, the system allows the subscriber to add, edit or delete more numbers in step 265, as described above. If the subscriber wishes to edit the telephone number or the greeting, the system moves on to step 260 where the system prompts the subscriber to create or select a personal greeting, as described above.

In another embodiment of the present invention, subscribers can create a greeting for one or more groups of callers. In this embodiment, when the subscriber adds a new caller's number to the personal list, the administration system provides the option for selecting a pre-existing greeting to be played for the caller. In another embodiment, the system prompts the subscriber to enter a list of caller numbers designated to receive a group greeting. In this embodiment, caller numbers can be added to or deleted from the group, and the group greeting can be modified using the administration system.

Figure 3:
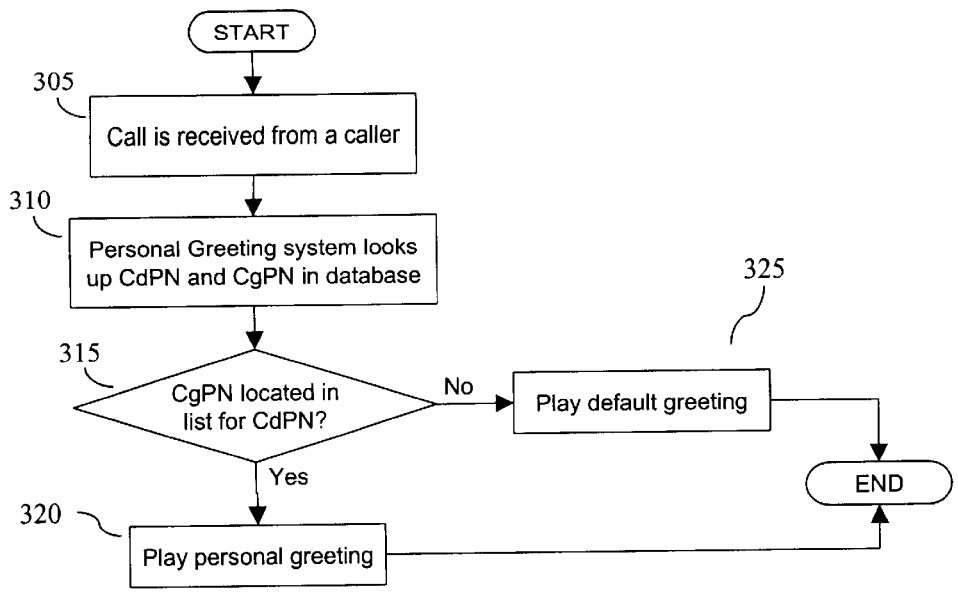
FIG. 3 is a flow diagram showing the steps executed in an example illustrating the greeting system in a preferred embodiment of the present invention.
Figure 3A:
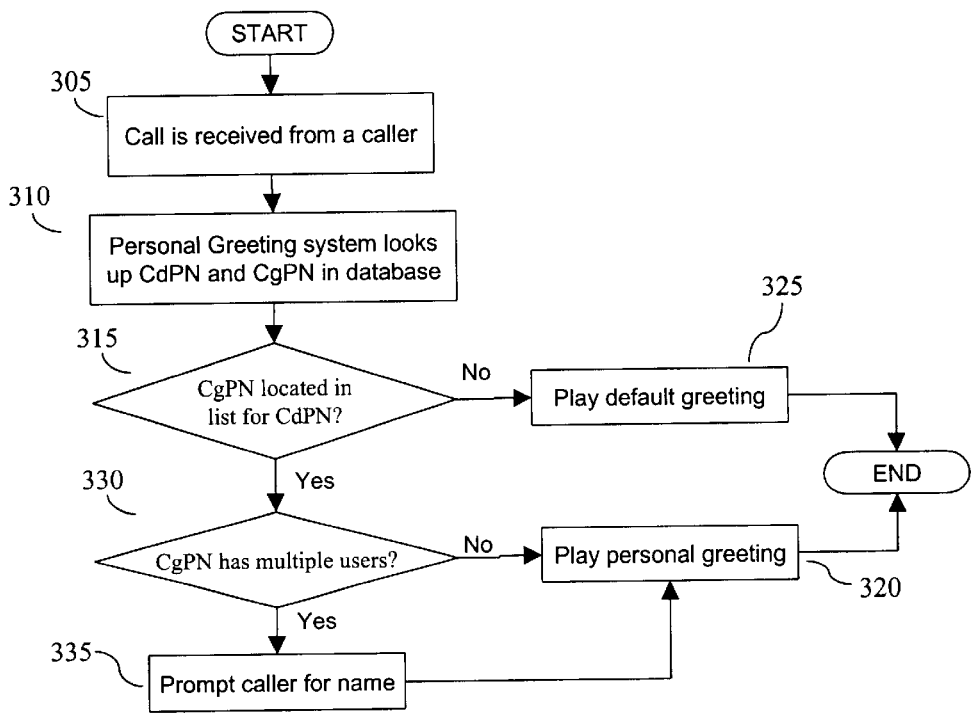
FIG. 3a is a flow diagram showing the steps executed in an example illustrating the greeting system in an alternative embodiment of the present invention.

FIG. 3 is an example of the steps to can be executed in a preferred embodiment of the present invention to provide a personal greeting. In step 305, a caller calls the subscriber's telephone number. If the call is answered by the subscriber's personal communications service, the personal greeting system of the present invention looks up the subscriber's number, i.e., the CdPN and the callers number, i.e., the CgPN, in the database (step 310). If the calling party number is located on the subscriber's personal list, i.e., the list associated with the CdPN (step 315), the system moves on to step 320. In step 320, the system plays the personal greeting to the caller. If the caller's number is not located on the list, the greeting system plays the subscriber's default greeting (step 325).

FIG. 3 includes steps 330 and 335, which are used in an alternate embodiment of the present invention. In this embodiment, the system determines whether or not the subscriber has multiple listings for a particular telephone number on his or her personal list (step 330). As discussed above, this embodiment allows the subscriber to provide personalized greetings even when the calling party number is a shared line. If the personal list has multiple entries for the CgPN, the system prompts the caller to enter his or her name or some other identifying code (step 335). The system then matches the name or code with the appropriate greeting and plays the greeting in step 320.

The location of the personal communication service of the present invention within the telephone network is not important. Thus, the personalized greetings could be offered as an integral part of systems operated by third party service providers. Alternatively, the personalized greetings could be delivered directly by the telephone service provider or it could be a part of the PBX at the called party number. In either case, the personal communications service of the present invention obtains the CgPN using conventional calling line identification service.

Figure 4:
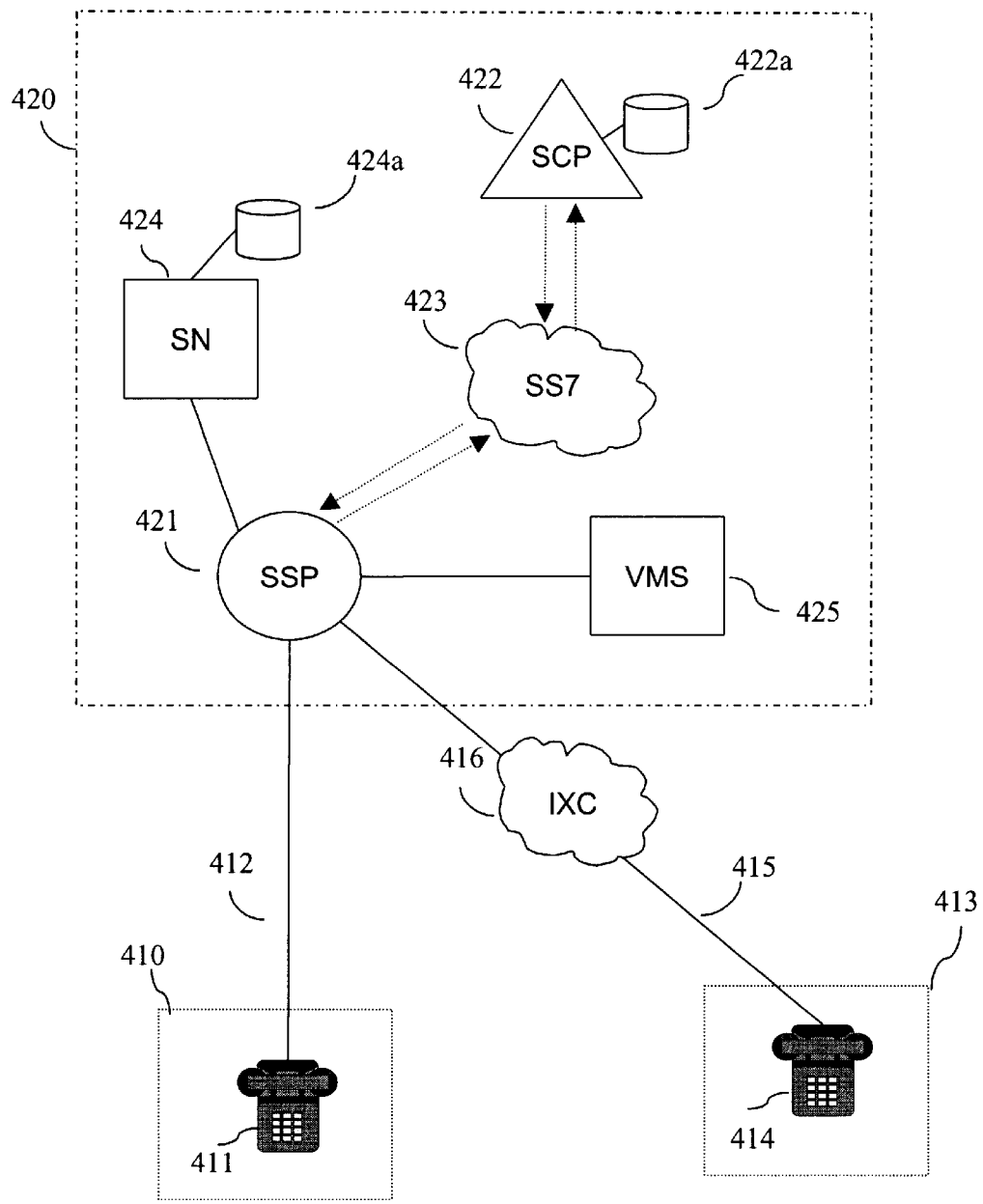
FIG. 4 is a schematic diagram showing an embodiment of the present system operating within the Advanced Intelligent Network.

FIG. 4 is a schematic diagram showing an example of an embodiment of the present invention using the AIN. FIG. 4 shows greeting service subscriber 410 having telephone 411 connected to telephone subscriber line 412. Subscriber line 412 is connected to SSP 421 in the telephone service provider's central office facility. When subscriber 410 signs up for the personal greeting service, an AIN trigger is provisioned on subscriber line 412 at SSP 421. In one embodiment, the trigger is a termination attempt trigger ("TAT"). When caller 413, using telephone 414 connected to telephone subscriber line 415, calls the subscriber's telephone number, the call hits the TAT at SSP 421. As shown in FIG. 4, caller 413 need not be part of the same telephone network 420 operated by subscriber 410's telephone service provider. Thus, the call from caller 413 may pass through inter-exchange carrier ("IXC") 416, as shown in FIG. 4, before encountering the TAT at SSP 421 or it may go directly to SSP 421.

In response to the TAT, SSP 421 suspends call processing, sends a query to SCP 422 for further instructions. Queries and responses, using the well known transactions capabilities user part ("TCAP"), are transmitted between SSP 421 and SCP 422 via Common Channel Signaling System Number 7 ("SS7") 423 as shown in FIG. 4. SCP 422 looks up the CdPN, i.e., the subscriber's number, in database 422*a*, and sends a response back to SSP 421. The response instructs SSP 421 to route the call to SN 424. When the call is connected to SN 424, the subscriber's number is retrieved from the redirecting party number field in the call setup message. The caller's number is retrieved from the calling party number field in the call setup message. SN 424 looks up the subscriber's number and the caller's number in database 424*a* to determine the appropriate personal greeting to play to caller 413. Once the appropriate personal greeting has been played, the call continues as it would in conventional systems. That is, for example, the call may be routed to voicemail system ("VMS") 425, or the call processing could continue with attempts to reroute the call to a different telephone or the call may simply be disconnected.

In another embodiment, SN 424 is not used. In this embodiment, SCP 422 routes the call directly to VMS 425. VMS 425 would then retrieve the subscriber's number and the caller's number and play the appropriate greeting to the caller.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A method for allowing a subscriber to provide customized announcements to callers, said method comprising:

populating a database on a server system with a subscriber telephone number, a list of designated caller numbers, associated caller names, and associated announcements;

storing a plurality of announcements on a messaging system, wherein each announcement is associated with at least one caller number from the list of designated caller numbers;

determining a caller's called party number and a caller's calling party number;

providing an announcement associated with the calling party number when the called party number matches the subscriber telephone number, the calling party number is in the list of designated caller numbers, and the calling party number appears only once in the list of designated caller numbers, wherein the server system comprises a service node; and providing the announcement associated with the calling party number and a caller name when the called party number matches the subscriber telephone number, the calling party number is in the list of designated caller numbers, the calling party number appears more than once in the list of designated caller numbers, and a caller has entered the caller name after being prompted, wherein the server system comprises a service node.

2. The method of claim 1, further comprising provisioning a trigger on the subscriber telephone number at a service switching point; suspending a call to the subscriber telephone number; and routing the call to the server system.

3. The method of claim 2, wherein the trigger is a termination attempt trigger.

4. The method of claim 1, further comprising providing a default announcement when the called party number matches the subscriber telephone number and the calling party number is not in the list of designated caller numbers.

5. The method of claim 1, wherein the populating a database on a server system comprises:

receiving a call from the subscriber;

authenticating the subscriber; and prompting the subscriber to enter a caller number, a caller name, and an announcement.

6. The method of claim 5, further comprising updating the database according to an instruction received from the subscriber.

7. A method for allowing a subscriber to provide customized announcements to callers, said method comprising:

populating a database on a server system with a subscriber telephone number, a list of designated caller numbers, associated caller names, and associated announcements;

storing a plurality of announcements on a messaging system, wherein each announcement is associated with at least one caller number from the list of designated caller numbers;

determining a caller's called party number and a caller's calling party number;

providing an announcement associated with the calling party number when the called party number matches the subscriber telephone number, the calling party number is in the list of designated caller numbers, and the calling party number appears only once in the list of designated caller numbers, wherein the messaging system comprises a service node; and providing the announcement associated with the calling party number and a caller name when the called party number matches the subscriber telephone number, the calling party number is in the list of designated caller numbers, the calling party number appears more than once in the list of designated caller numbers, and a caller has entered the caller name after being prompted, wherein the messaging system comprises a service node.

8. The method of claim 7, further comprising the step of providing a default announcement when the called party number matches the subscriber telephone number and the calling party number is not in the list of designated caller numbers.

9. The method of claim 7, wherein the populating a database on a server system comprises receiving a call from the subscriber, authenticating the subscriber; and prompting the subscriber to enter a caller number, a caller name and an announcement.

10. A method for allowing a subscriber to provide customized announcements to callers, said method comprising:

populating a database on a server system with a subscriber telephone number, a list of designated caller numbers, associated caller names, and associated announcements;

storing a plurality of announcements on a messaging system, wherein each announcement is associated with at least one caller number from the list of designated caller numbers;

determining a caller's called party number and a caller's calling party number;

providing an announcement associated with the calling party number when the called party number matches the subscriber telephone number, the calling party number is in the list of designated caller numbers, and the calling party number appears only once in the list of designated caller numbers, wherein the server system and the messaging system comprise a service node; and providing the announcement associated with the calling party number and a caller name when the called party number matches the subscriber telephone number, the calling party number is in the list of designated caller numbers the calling party number appears more than once in the list of designated caller numbers, and a caller has entered the caller name after being prompted, wherein the server system and the messaging system comprises a service node.

11. The method of claim 10, further comprising providing a default announcement when the called party number matches the subscriber telephone number and the calling party number is not in the list of designated caller numbers.

12. The method of claim 10, wherein the populating a database on a server system comprises receiving a call from the subscriber, authenticating the subscriber; and prompting the subscriber to enter a caller number, a caller name, and an announcement.

13. A method for allowing a subscriber to provide customized announcements to callers, said method comprising:

populating a database on a service node with a subscriber telephone number, a list of designated caller numbers, associated caller names, and associated announcements;

storing a plurality of announcements on the service node, wherein each announcement is associated with at least one caller number from the list of designated caller numbers;

provisioning a trigger on a service switching point for the subscriber telephone number;

sending a query from the service switching point to a service control point in response to a call to the subscriber telephone number, said query comprising a caller's called party number and a caller's calling party number;

sending a response from the service control point to the service switching point, said response instructing the service switching point to connect the call to a messaging system when the called party number matches the subscriber telephone numbers and the calling party number is in the list of designated caller numbers, and the calling party number appears only once in the list of designated caller numbers, wherein said response identifies an announcement associated with the calling party number;

sending said response from the service control point to the service switching point, said response instructing the service switching point to connect the call to a messaging system when the called party number matches the subscriber telephone number, the calling party number is in the list of designated caller numbers, the calling party number appears more than once in the list of designated caller numbers and a caller has entered a caller name after being prompted, wherein said response identifies the announcement associated with the calling party number and the caller name;

connecting the call to the messaging system; and providing the caller with the announcement.

14. The method of claim 13, wherein the trigger is a termination attempt trigger.

15. The method of claim 13, wherein the query and the response comprise transaction capabilities application part messages.

16. A system for allowing a subscriber to provide customized announcements to callers, said system comprising:

a database on a server system, said database comprising a subscriber telephone number, a list of designated caller numbers, associated caller names, and associated announcements;

a messaging system in communication with the server system, said messaging system comprising a plurality of announcements, wherein each announcement is associated with at least one caller number from the list of designated caller numbers; and a module on the server system, wherein said module determines a caller's called party number and a caller's calling party number, wherein when the called party number matches the subscriber telephone number, the calling party number is in the list of designated caller numbers, and the calling party number appears only once in the list of designated caller numbers, the server system instructs the messaging system to provide a caller with an announcement associated with the calling party number, wherein when the called party number matches the subscriber telephone number, the calling party number is in the list of designated caller numbers, the calling party number appears more than once in the list of designated caller numbers and the caller has entered a caller name after being prompted, the server system instructs the messaging system to provide the caller with the announcement associated with the calling party number and the caller name, wherein the server system is a service node.

17. The system of claim 16, wherein when the called party number matches the subscriber telephone number and the calling party number is not in the list of designated caller numbers the server system instructs the messaging system to provide the caller with a default announcement.

18. The system of claim 16, further comprising a voice mail system, wherein the subscriber telephone number is a voice mail number for the subscriber.

19. A system for allowing a subscriber to provide customized announcements to callers, said system comprising:

a database on a server system, said database comprising a subscriber telephone number, a list of designated caller numbers, associated caller names, and associated announcements;

a messaging system in communication with the server system, said messaging system comprising a plurality of announcements, wherein each announcement is associated with at least one caller number from the list of designated caller numbers; and a module on the server system, wherein said module determines a caller's called party number and a caller's calling party number, wherein when the called party number matches the subscriber telephone number, the calling party number is in the list of designated caller numbers, and the calling party number appears only once in the list of designated caller numbers, the server system instructs the messaging system to provide a caller with an announcement associated with the calling party number, wherein when the called party number matches the subscriber telephone number, the calling party number is in the list of designated caller numbers, the calling party number appears more than once in the list of designated caller numbers and the caller has entered a caller name after being prompted, the server system instructs the messaging system to provide the caller with the announcement associated with the calling party number and the caller name, wherein the messaging system includes a service node.

20. The system of claim 19, wherein the database and module are on a service control point and wherein the messaging system is on a service node.

21. The system of claim 19, further comprising a voice mail system, wherein the subscriber telephone number is a voice mail number for the subscriber.

* * * * *